UNITED STATES PATENT OFFICE.

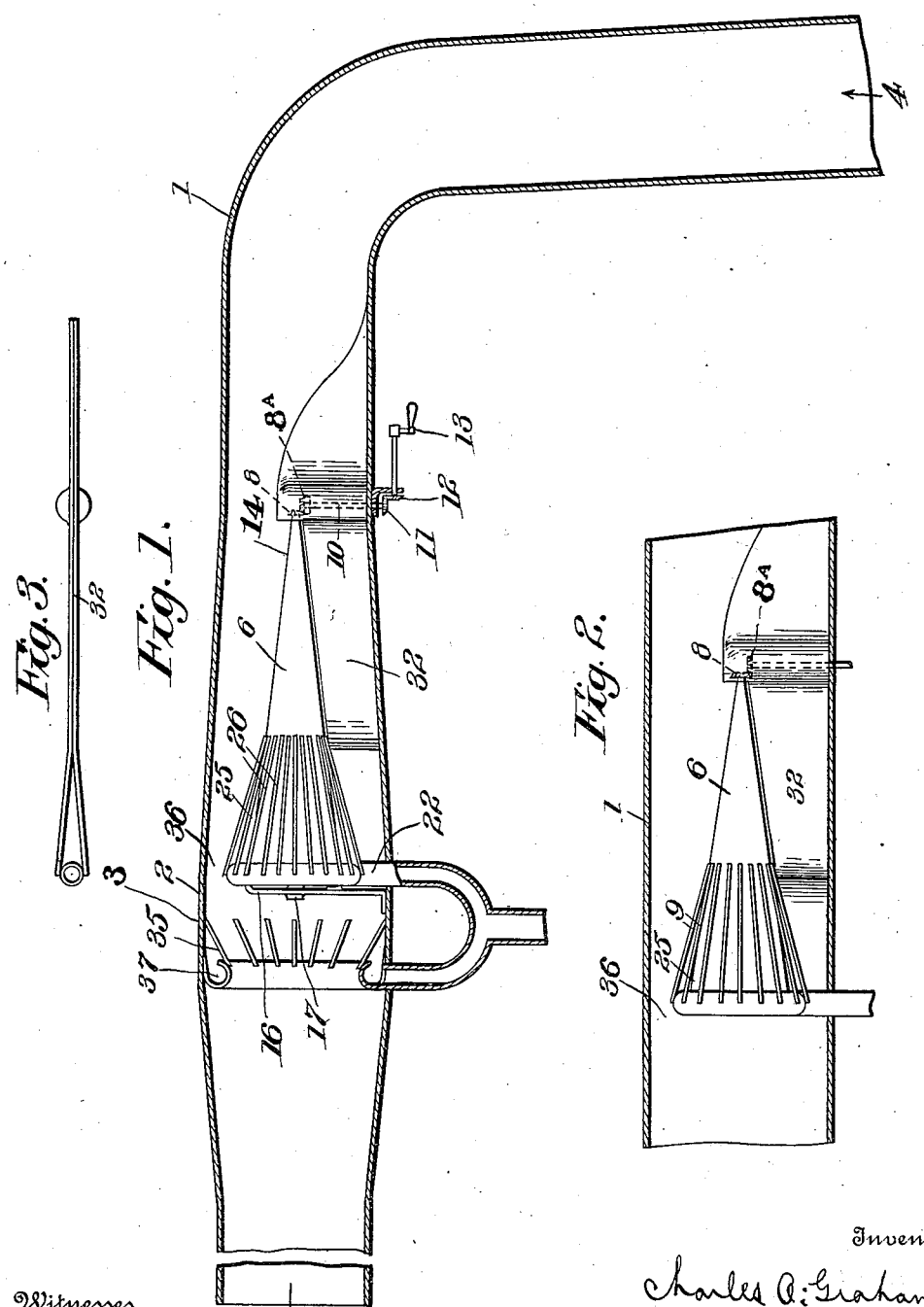

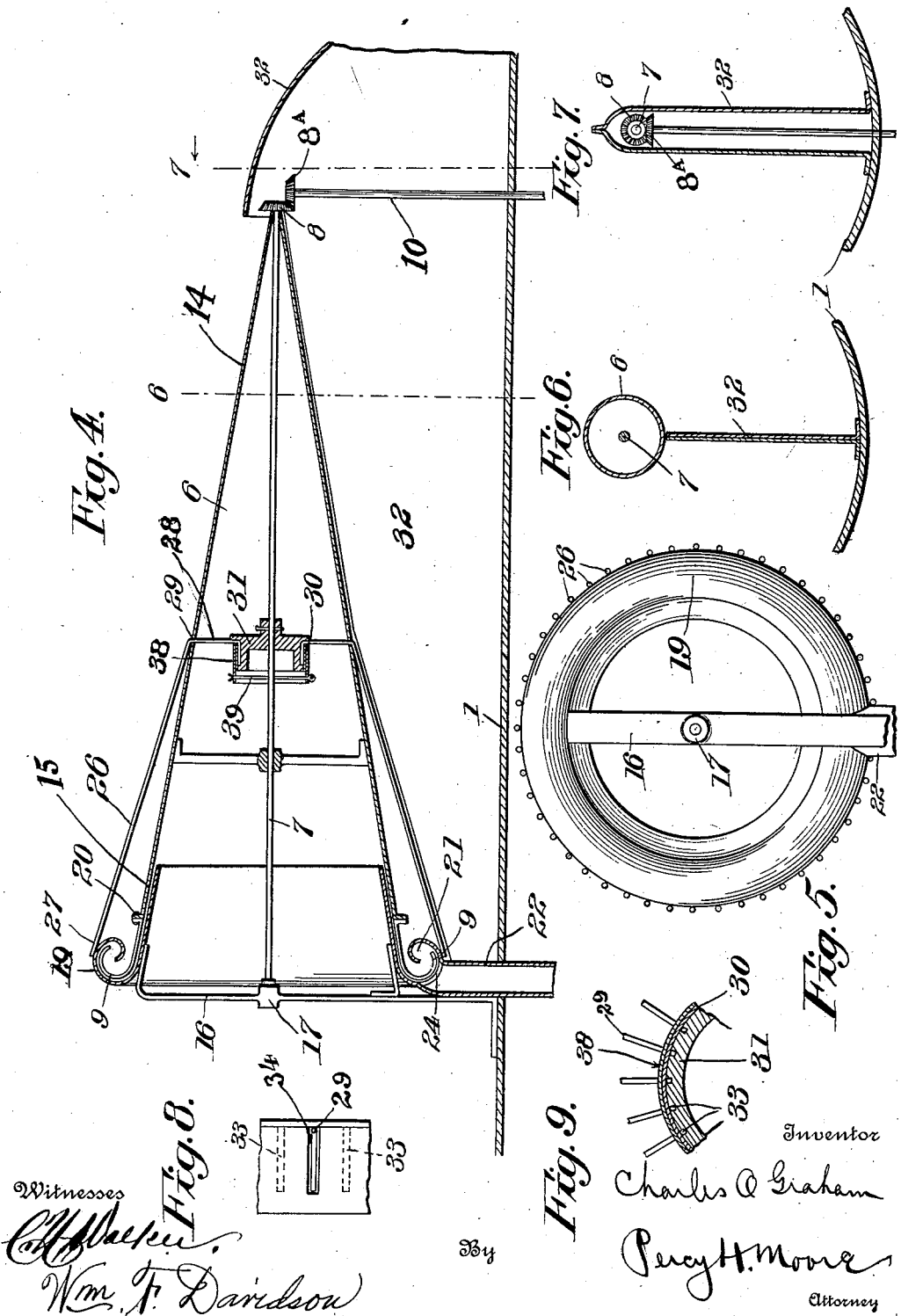

CHARLES O. GRAHAM, OF LOGAN, KANSAS.

GRAIN-SAVER.

1,011,772.    Specification of Letters Patent.    Patented Dec. 12, 1911.

Application filed February 18, 1911. Serial No. 609,517.

*To all whom it may concern:*

Be it known that I, CHARLES O. GRAHAM, a citizen of the United States, residing at Logan, in the county of Phillips and State of Kansas, have invented certain new and useful Improvements in Grain-Savers, of which the following is a specification.

This invention relates to grain saving devices and more particularly to attachments for pneumatic straw stacking machines.

The object of this invention is to provide an attachment which can readily be attached to the blow pipe of a pneumatic straw stacking machine and which will collect and deposit all or nearly all the grain which may be contained in the wheat straw after the threshing operation.

Heretofore the devices designed for separating the grain from the straw as the latter passes through the stacker have been most unsatisfactory, and in fact, impracticable owing to the fact that the straw has a tendency to clog or choke the pockets or passageways provided for the grain and thus require constant attention.

In carrying out my invention I provide means for separating the grain from the straw comprising a deflector for the straw, a trap for arresting the outflow of the grain and means for preventing the grain arresting member from becoming clogged.

My invention is illustrated in preferred form in the accompanying drawings, in which—

Figure 1 is a sectional view showing my improvement attached to a blow-pipe having an enlargement. Fig. 2 is a similar view to Fig. 1 showing my improvement attached to a straight pipe. Fig. 3 is a plan view of deflector plate. Fig. 4 is a section of the conical body with attachments. Fig. 5 is an end view of the conical body. Fig. 6 is a section on the line 6—6 of Fig. 4. Fig. 7 is a section on the line 7—7 Fig. 4. Figs. 8 and 9 are detail views showing manner of attaching wires 29.

Referring more particularly to the drawings in which like numerals refer to corresponding parts throughout the several views; 1 indicates a blow pipe or stacker carried by a threshing machine (not shown). The pipe 1 preferably of sheet metal has an enlarged or bulged central portion 2 which tapers forwardly and rearwardly from the point 3 toward the inlet and outlet 4 and 5 respectively. While the pipe 1 is preferably formed with an enlargement 2, this is not necessary and as shown in Fig. 2 the blow pipe may be of uniform dimensions.

Arranged within the pipe 1 is a cone shell 6 supported upon and fixed to a rotary shaft 7, the inner end of which has a bevel gear 8 meshing with a gear 8ª on a vertical shaft 10. Upon the opposite end of the shaft 10 is a bevel gear 11 which in turn meshes with a bevel gear 12 on crank handle 13, by means of which the cone may be manually rotated.

The cone 6 may be located at any point within the pipe 1, but preferably is positioned as shown in Fig. 1, with the contracted end 14 adjacent the inlet 4 and the other end 15 thereof directly opposite the enlargement 2. Secured to the mouth of the cone as by rivets 20 are a plurality of outwardly curved hooked members 9, for a purpose hereinafter described.

A spider frame 16 having a central bearing 17 for the shaft 7, is located slightly in advance of the mouth of the cone and has an annular curved flange 19 suitably secured thereto. This curved flange 19 as more clearly shown in Fig. 4, incloses and conforms to the curvature of the hooked members 9 thus forming an annular pocket 21 adapted to catch the outwardly traveling grain. A pipe 22 registering with the opening 24 in the pocket 21 answers the double purpose of a support for the frame 16 and an outlet for the grain.

To prevent the straw from entering the pocket 21 I provide a guard or deflector 25 comprising a plurality of spaced wires 26. The free ends 27 of these wires rest upon the curved flange 19 surrounding the pocket 21, and the inner ends 28 pass through perforations 29 in the cone 6 and are securely clamped between rings 30 and 31. It will be noted that ring 30 is split and that ring 31 is provided with a plurality of peripheral notches 33 to facilitate the insertion of the wires therebetween. To place one of the wires in position it is merely necessary to insert the hooked end of the wire 26 through one of the perforations in the cone 6 and into one of the notches in the ring 31. The ring 30 is then rotated slightly until the opening 34 is opposite the next peripheral notch and so on until all the wires have been attached. This arrangement permits of the ready removal of a broken or otherwise damaged wire. After all the wires have been secured in place a clamping ring 38 may be inserted over the ring 30 and the wires tightly clamped between the rings 30 and 31 by means of key 39. If desired Babbitt or other metal may also be used to form a tighter bond between the parts. A deflector plate 32 is also provided to guide the straw around the vertical shaft 10 and pipe 22 to prevent clogging at these points.

From the foregoing the operation of the invention will be apparent, but may be briefly stated as follows: Straw is fed into the pipe 1 through inlet 4 under considerable pneumatic pressure and is forced out through the annular space 36, the wire deflector 25 preventing the straw from entering the pocket 21. The grain being heavier than the straw, the former will have a tendency to drop by force of gravity and as the wires 26 of the deflector are sufficiently spaced to permit the passage of the grain therebetween, the latter will hug the face of the cone 6 and be guided into the pockets 21. Should any considerable amount of grain succeed in passing out through the space 33, a second annular pocket 37 having spaced wire deflectors 35 will arrest the same. It will of course be understood that simultaneously with the operation above described the cone 6 will be manually rotated to cause the hooked projections 9 to agitate and prevent the accumulation of any foreign matter such as damp chaff or broken straws which may find their way into the pockets 21.

Having thus described my invention, what I claim is:

1. The combination with a blow pipe for pneumatic straw stacking machines having an inlet and an outlet and an enlarged intermediate portion, of a grain arrester within said pipe comprising a hollow cone shaped body having its apex adjacent said inlet and its open end within said enlargement, a stationary frame adjacent said open end and an outwardly curved flange on said frame.

2. The combination with a blow pipe for pneumatic straw stacking machines having an inlet and an outlet and an enlarged intermediate portion, of a hollow cone shaped body having its apex extending toward said inlet and its open end within said enlargement, means on said cone for deflecting the straw and means adjacent the open end of said cone for arresting and collecting the grain.

3. The combination with a blow pipe for pneumatic straw stacking machines having an inlet and an outlet and an enlarged portion, of a hollow cone shaped body having its apex extending toward said inlet and its open end within said enlarged portion, an annular flange adjacent the open end of said cone forming a pocket, means for supporting said flange, and means on said cone causing the straw to pass around said flange and permitting the grain to enter said pocket.

4. The combination with a blow pipe for pneumatic stacking machines having an inlet and an outlet and an enlarged portion, of a hollow cone shaped body within said enlargement, the apex of said cone extending toward said inlet, an annular flange fixed adjacent the open end of said cone, and a plurality of spaced wires having one end thereof attached to said cone and the other end resting on said annular flange.

5. An attachment for pneumatic stacking machines having a blow pipe, comprising a conical body within said pipe an annular flange on said body forming a pocket, and means for deflecting the straw around said flange, said means permitting the grain to enter said pocket.

6. An attachment for pneumatic stacking machines having a blow pipe, comprising a rotatable hollow conical body within said pipe, an annular flange around the open end of said conical body forming a pocket, projections on said conical body extending within said pocket and means for rotating said body.

7. An attachment for pneumatic stacking machines having a blow pipe, comprising a rotatable conical body with said pipe, a frame adjacent one end of said conical body, an outwardly curved flange on said frame forming a pocket, hooked projections on said conical body extending within said pocket and conforming to the curvature of said flange.

8. An attachment for pneumatic straw stackers having a blow pipe, comprising a cone within said pipe, an annular pocket adjacent one end of said cone, a plurality of curved plates projecting from said cone within said pocket, spaced wires having one thereof attached to said cone and the other end extending adjacent to and outside said pocket and means for rotating said cone.

9. An attachment for pneumatic straw stacking machines having a blow pipe, comprising a rotatable hollow conical body within said pipe, means on said conical body for deflecting the straw away from said conical body and means for arresting the flow of grain.

10. An attachment for pneumatic straw stacking machines having a blow pipe, comprising a conical body within said pipe, and means within said pipe for arresting the flow of grain.

11. An attachment for pneumatic stacking machines having a blow pipe, comprising a hollow cone within said pipe, said cone having an annular row of perforations, a straw deflector on the outer face of said cone, said deflector comprising a plurality of spaced wires having inner hooked ends passing through said perforations, and means within said cone clamping the ends of said wires.

12. An attachment for pneumatic stacking machines having a blow pipe, comprising a hollow cone within said pipe, said cone having an annular row of perforations, a straw deflector on the outer face of said cone, said deflector comprising a plurality of spaced wires having inner hooked ends passing through said perforations, a notched ring within said cone adapted to receive the ends of said wires, and a split ring mounted for rotation on said notched ring, whereby, said wires can be inserted one at a time and be held securely in place by said split ring.

In testimony whereof I affix my signature in presence of two witnesses.

CHARLES O. GRAHAM.

Witnesses:
P. H. MOORE,
C. W. FOWLER.

Copies of this patent may be obtained for five cents each, by addressing the "Commissioner of Patents, Washington, D. C."